(12) United States Patent
Gras

(10) Patent No.: US 6,625,526 B2
(45) Date of Patent: Sep. 23, 2003

(54) METHOD AND DEVICE FOR MONITORING VEHICLES AND/OR CONTROL FUNCTIONS

(75) Inventor: Juergen Gras, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/937,881

(22) PCT Filed: Jan. 17, 2001

(86) PCT No.: PCT/DE01/00172

§ 371 (c)(1),
(2), (4) Date: Oct. 1, 2001

(87) PCT Pub. No.: WO01/56837

PCT Pub. Date: Aug. 9, 2001

(65) Prior Publication Data

US 2002/0156557 A1 Oct. 24, 2002

(30) Foreign Application Priority Data

Feb. 5, 2000 (DE) .......................... 100 05 185

(51) Int. Cl.⁷ .......................................... B60R 16/02
(52) U.S. Cl. .......................... 701/29; 701/34; 340/450; 73/290 R; 73/291
(58) Field of Search ............. 701/29, 34; 340/450, 340/450.1, 450.2, 450.3; 73/290 R, 291

(56) References Cited

U.S. PATENT DOCUMENTS

| | | | | |
|---|---|---|---|---|
| 3,675,227 A | * | 7/1972 | Fukasawa et al. | 340/450 |
| 4,057,700 A | * | 11/1977 | Nakashima | 200/81.9 M |
| 4,402,048 A | * | 8/1983 | Tsuchida et al. | 340/612 |
| 4,491,103 A | | 1/1985 | Deadman | |
| 4,547,972 A | * | 10/1985 | Heidel et al. | 33/299 |
| 4,610,165 A | * | 9/1986 | Duffy et al. | 73/305 |
| 4,768,377 A | * | 9/1988 | Habelmann et al. | 340/450.3 |
| 4,890,491 A | * | 1/1990 | Vetter et al. | 702/100 |
| 4,912,646 A | * | 3/1990 | Cerruti | 340/450.2 |
| 5,072,615 A | | 12/1991 | Nawrocki | |

FOREIGN PATENT DOCUMENTS

| FR | 2 370 607 A | 6/1978 |
|---|---|---|
| GB | 2 277 619 A | 11/1994 |

* cited by examiner

*Primary Examiner*—William A Cuchlinski, Jr.
*Assistant Examiner*—Eric M Gibson
(74) *Attorney, Agent, or Firm*—Michael J. Striker

(57) ABSTRACT

The invention proposes a method and apparatus for monitoring operating and/or driving parameters of a motor vehicle, whereby the measured data for monitoring the operating and/or driving functions supplied by a sensor are checked by the control function in dependence on the inclination angle of the motor vehicle in the longitudinal or transverse direction of the vehicle. If a specified limit for the inclination angle is exceeded, the error message is suppressed if the detected error occurs only briefly. Error messages relating to the fluid level in the tank cooling-water compartment, engine compartment, and transmission compartment can therefore be suppressed. The error is output only when an actual error exists the remains for a longer period of time. In an alternative embodiment of the invention, it is provided that error messages also be detected and evaluated as a function of dynamic driving parameters such as rotational speeds and/or accelerations. A preferred application is in off-road vehicles.

13 Claims, 1 Drawing Sheet

METHOD AND DEVICE FOR MONITORING VEHICLES AND/OR CONTROL FUNCTIONS

RELATED ART

The invention is based on a method and an apparatus for monitoring operating and/or driving parameters of a motor vehicle. Various methods and apparatuses for monitoring operating and driving parameters are already known. For example, driving speed, driving direction, and engine management are monitored for operational reliability. Likewise, sensors for monitoring the fuel level in the tank or the fluid level detector in the cooling water and the like are known, for example. If the fluid level in the tank is too low, or if the cooling-water level has dropped, for example, the sensor signals an appropriate error message to the control, which outputs a corresponding warning. This is important to prevent impending vehicle or engine damage.

In certain driving situations it is desirable, however, that this error message not always be output, because the error state occurs only very briefly and does not pose a danger in this special driving situation.

Additionally, the driver is irritated when the error message appears and he is unable to determine its significance.

ADVANTAGES OF THE INVENTION

In contrast, the method and the apparatus according to the invention have the advantage that an error message is suppressed by the control when this error message can be predicted based on the current driving situation, but it is not damaging to the vehicle or the driving situation. For instance, when one drives up or down a steep hill in particular, a fuel level sensor can generate an error message when the fuel level in the tank becomes low, although this situation is not necessarily critical. In general, the fuel dispensing system is designed to ensure that the engine operates properly even when the vehicle is driven uphill or downhill with a low fluid level and brief interruptions of fuel delivery. It is advantageous for the error message to be suppressed in this case, because it would only serve to irritate the driver.

It is considered to be particularly advantageous that the inclination sensor detects the inclination angle either in the driving direction along the longitudinal axis of the vehicle, or transverse to the vehicle, and feeds a corresponding signal to the control. For example, unpredictable inclined positions of the motor vehicle can occur with off-road vehicles on hilly terrain that have nothing to do with a fault in the sense of an error diagnosis. This is given in particular when it comes to monitoring, e.g., the fluid level of fuel in the tank, the cooling-water in the cooling system, the engine oil and/or hydraulic fluid, or even the windshield washer fluid and the like.

When it comes to servicing the vehicle, however, it is desirable if errors that have occurred are stored as a function of the associated inclination angle, so that an error that occurred can be interpreted correctly and unequivocally. The output of the error on a display in optical or acoustic form thereby represents a simple and inexpensive solution for the driver.

As an alternative, output via a corresponding service panel—which is present anyway in modern vehicles—is also significant for the repair facility, because errors that occur once or rarely can be detected easily in this fashion, and their meaning can be interpreted correctly.

It also appears to be particularly advantageous to limit the error suppression in terms of time. Because, if the error is signalled constantly, it can be assumed that a true error exists that is not related to the current driving situation.

DIAGRAM

An embodiment of the invention is shown in the diagram and described in greater detail in the figures.

DESCRIPTION OF THE DESIGN EXAMPLE

Figure 1:
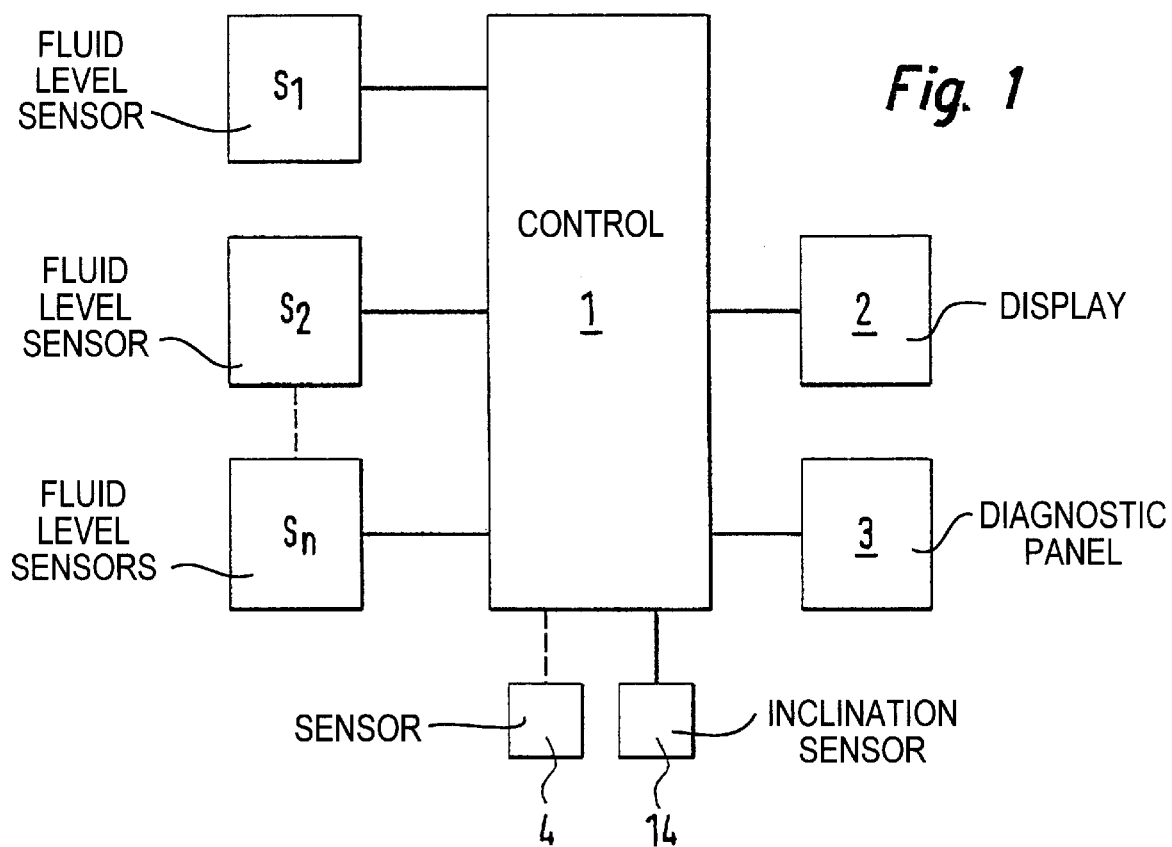
FIG. 1 shows a block diagram.

FIG. 1 shows a control 1, to which various sensors S1, S2 ... $S_n$ are connected. A fluid level sensor for fuel in a tank 11 (FIG. 2) is provided as $S_1$, for example. $S_2$ is a water level sensor, for cooling water or windshield washer fluid, for instance. Modern vehicles usually have a number of fluid level sensors that are used to monitor associated fluid levels. They are represented altogether as $S_n$. Moreover, the control 1 is connected to an inclination sensor 14, which detects an inclination angle a of the vehicle, preferably in the longitudinal direction and/or in the transverse direction. On the outlet side, the control 1 is connected to a display 2, at which the detected error messages can be output either optically or acoustically. A diagnostic panel 3 is also provided, from which the detected error messages can be called up subsequently along with the corresponding inclination angle a.

In an alternative design of the invention, it is provided that a rotational speed sensor or an acceleration sensor 4 be connected to the control 1, and that the error messages detected by the sensors Sn be measured and stored as a function of the signals from the rotational speed or acceleration sensor 4.

Figure 2:
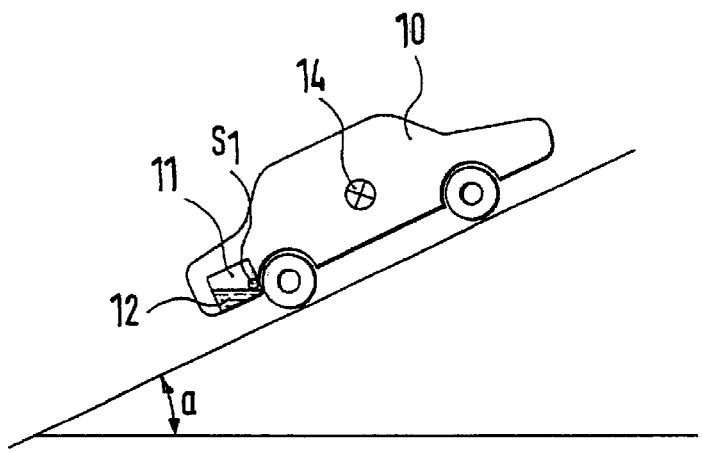
FIG. 2 shows a schematic illustration of a motor vehicle on a slope.

The mode of operation of this arrangement will be described in greater detail using the schematic illustration in FIG. 2. FIG. 2 shows a motor vehicle 10 on a slope having an inclination angle a. The motor vehicle 10 has a tank 11 in which the fluid level sensor S1 for the fuel is situated in an appropriate place, so that the current fluid level can be measured. This fluid level changes as a function of the inclination angle a as well as the driving style, whereby corresponding sensors 4 detect the cornering, rotation, acceleration, and braking of the vehicle. Corresponding fluid level sensors S2 are also provided for the cooling water, engine oil, transmission fluid, hydraulic fluid, windshield washing fluid, etc. To ensure clarity, these sensors are not shown in greater detail.

During normal driving operation, the control 1 continously detects the signals from the connected sensors S1, S2, Sn, 4, 14, and calculates whether the monitored functions are in order based on the specified limit values. If an error occurs, the signals received are stored as a function of the inclination angle a and/or the further dynamic parameters such as angle of rotation and acceleration. This monitoring is relevant for off-road vehicles in particular, which are also used on extremely hilly terrain. If the fluid level sensor $S_1$ signals lack of fuel, for example, and sends a message to this effect to the control 1, then the control 1 evaluates this message with consideration for the inclination angle measured at that time by the inclination sensor 14 and/or further sensors 4. If the fault is short-lived within a specified period of time that can be monitored using an appropriate filter, then this error message will be suppressed in order to avoid irritating the driver of the motor vehicle. In an alternative design of the invention it can be provided that this error message be stored and output at a diagnostic panel 3, whereby, in addition to the error message, the associated inclination angle a and acceleration and rotational speeds can also be output.

In order to distinguish between short-term error messages and actual errors, the error message is monitored using a second filter (a low-pass filter or a time interval). If the error does not reoccur after this second limit is passed, then the error memory is reset. Using this method, the parameters named previously can be either output or suppressed in simple fashion as a function of the inclination angle a and/or the dynamic driving parameters. It is provided that the driver can shut off individual monitoring functions using an appropriate switch, if he so chooses. In this case, the automatic error output is then turned off.

For the diagnostic panel 3, however, it is provided that all diagnostic functions can be queried as a function of the inclination angle or the dynamic parameters, whereby the output can take place in the form of a table with consideration for the inclination angle a and/or the further dynamic driving parameters.

Additionally, it is pointed out that the error suppression function is disabled when the specified limit value for the inclination angle is undershot once more. To prevent a flickering in the limit range, it is advantageous to provide a hysteresis for the limit value for the release of the error message, so that the release can be carried out only when the hysteresis is passed.

What is claimed is:

1. Method for monitoring operating or driving parameters of a motor vehicle, whereby measured data supplied by at least one sensor (Sn) are registered by a control and checked for plausibility and, if appropriate, an error message is output on a display (2), characterized in that the motor vehicle (10) has an inclination sensor (14), and that the control (1) suppresses the error message for a selected operating or driving parameter when an inclination angle (a) of the motor vehicle (10) signaled by the inclination sensor (14) exceeds a specified limit value, wherein the control (1) stores the error message received with consideration for the inclination angle (a) or further dynamic operating or driving parameters.

2. Method according to claim 1, characterized in that the inclination sensor (14) detects the inclination angle in a direction of the longitudinal axis of the vehicle.

3. Method according to claim 1, characterized in that the inclination sensor (14) detects the inclination angle in a direction of the transverse angle of the vehicle.

4. Method according to claim 1, characterized in that the control (1) suppresses the error message when a fluid level sensor (S1) for fuel or a fuel delivery pump sends an error message.

5. Method according to claim 1, characterized in that the control (1) suppresses the error message when a fluid level sensor (S2) for cooling water sends an error message.

6. Method according to claim 1, characterized in that the control (1) suppresses an error message when a fluid level sensor (Sn) for motor oil, transmission fluid, or hydraulic fluid sends an error message.

7. Method according to claim 1, characterized in that the control (1) outputs the error message optically or acoustically on a display (2).

8. Method according to claim 1, characterized in that the error message can be output at a diagnostic panel (3).

9. Method according to claim 1, characterized in that the control (1) finally permits the error message to be displayed when, with consideration for a specified hysteresis, the specified limit value for the inclination angle is undershot.

10. Method according to claim 1, characterized in that the error message is suppressed for a specified period of time.

11. Apparatus for performing the method according to claim 1 having a sensor to monitor operating or driving parameters of a motor vehicle and having a control (1), characterized in that an inclination angle sensor (14) is connected to the control (1), and that the control (1) is designed to store an error message received as a function of the inclination angle (a) detected or further dynamic operating or driving parameters.

12. Apparatus according to claim 11 characterized in that the control (1) is designed to suppress the error message when a specified limit for the inclination angle (a) is exceeded.

13. Apparatus according to claim 11 characterized in that the apparatus can be used in an off-road vehicle (10).

* * * * *